United States Patent [11] 3,587,686

| [72] | Inventor | Robert G. Dixon<br>Salem, Oreg. |
|---|---|---|
| [21] | Appl. No. | 827,614 |
| [22] | Filed | May 26, 1969 |
| [45] | Patented | June 28, 1971 |
| [73] | Assignee | A. B. McLauchlan Co. Inc.<br>Salem, Oreg. |

[54] DEVICE FOR STEMMING CERTAIN BERRIES AND FRUITS
1 Claim, 9 Drawing Figs.

| [52] | U.S. Cl. | 146/55 |
|---|---|---|
| [51] | Int. Cl. | A23n 15/00 |
| [50] | Field of Search | 146/55, 49.1, 50 |

[56] References Cited
UNITED STATES PATENTS

| 2,527,303 | 10/1950 | Gaddie | 146/55 |
|---|---|---|---|
| 2,707,982 | 5/1955 | Magnuson | 146/55 |
| 3,437,116 | 4/1969 | Daugherty | 146/49(.1) |

Primary Examiner—Willie G. Abercrombie
Attorney—L. R. Geisler

ABSTRACT: A roll bed, arcuate in cross section, is composed of a series of adjacent rotating rollers of substantially the same outside diameter. The adjacent rollers are driven in opposite directions. The rollers have cooperating surfacings designed to cause stems and hulls to be drawn down between the rollers of each pair, and the entire bed is oscillated and also preferably slightly inclined from the inlet end to the outlet end.

ROBERT G. DIXON
INVENTOR.

BY *L.R. Geisler,*
ATTY.

PATENTED JUN 28 1971

ROBERT G. DIXON
INVENTOR.

BY *H.A. Quinlan*
ATTY.

ROBERT G. DIXON
INVENTOR

BY
ATTY.

DEVICE FOR STEMMING CERTAIN BERRIES AND FRUITS

BACKGROUND OF THE INVENTION

Various mechanical devices have been developed for stemming cherries which employ pairs of adjacent rollers rotating towards each other. An early example of such a device is described in U.S. Pat. No. 1,400,352, issued under date of Dec. 13, 1921. While this device could probably be used with some success for cherries, its use is largely limited to cherries and it could not be employed for removing the stems and hulls from strawberries, for example.

U.S. Pat. No. 2,479,961, issued Aug. 23, 1949, describes a machine more specifically designed for removing the stems and hulls from strawberries. In this machine a rotating drum is composed of spaced pairs of adjacent rollers, the rollers of each pair engaging each other, one of the rollers being driven and the other rotating in opposite direction through contact with the driven roller. However, the fact that the drum rotates and that inclined plates are employed for pushing the berries along over the gaps between the pairs of rollers would cause ripe, juicy berries to become too damaged by the treatment in this device, although harder berries possibly could be handled successfully in the same.

The device described in U.S. Pat. No. 2,527,303, issued under date of Oct. 24, 1950, avoids some of the objections to the device of the previously mentioned patent in that there is no wide spacing between the pairs of rollers forming the roll bed. The rollers are alternately formed with surfaces of corrugated metal and soft rubber. As in the device of the previously mentioned U.S. Pat. No. 2,479,961, the metal rollers are independently driven and the rubber rollers are driven by contact with the metal rollers. The roll bed as a whole is stationary and a helical screw conveyor is required for moving the berries or fruits along the roll bed. However, a similar objection is to be found with this device if it is used for ripe, juicy strawberries inasmuch as there is inadequate protection against the bruising and damaging of such berries.

The object of the present invention is to provide an improved machine particularly suitable for removing the stems and hulls from strawberries, as well as for removing the stems from cherries, and in which ripe, juicy strawberries can be handled without danger of any appreciable damage to the berries.

SUMMARY OF THE INVENTION

The berries or fruits to be treated are delivered into one end of an oscillating bed and discharged from the opposite end. The bed, which is arcuate in cross section and preferably slightly inclined longitudinally downwardly, is composed of rotating rollers closely adjacent to each other and all driven, the alternate rollers being rotated in one direction and the intervening rollers being rotated in the opposite direction. The rollers are surfaced in such a manner, for example alternately of ribbed metal and soft rubber, so as to cause the stems and hulls to be drawn down between the rollers of a pair of cooperating rollers. Water sprays serve the double purpose of washing the berries or fruit and of assisting them to travel along the oscillating bed to the discharge end. No other elements contact the berries or fruit and, due to the gentle handling to which the berries are subjected, the device is especially suited for ripe and juicy strawberries.

Figure 1:
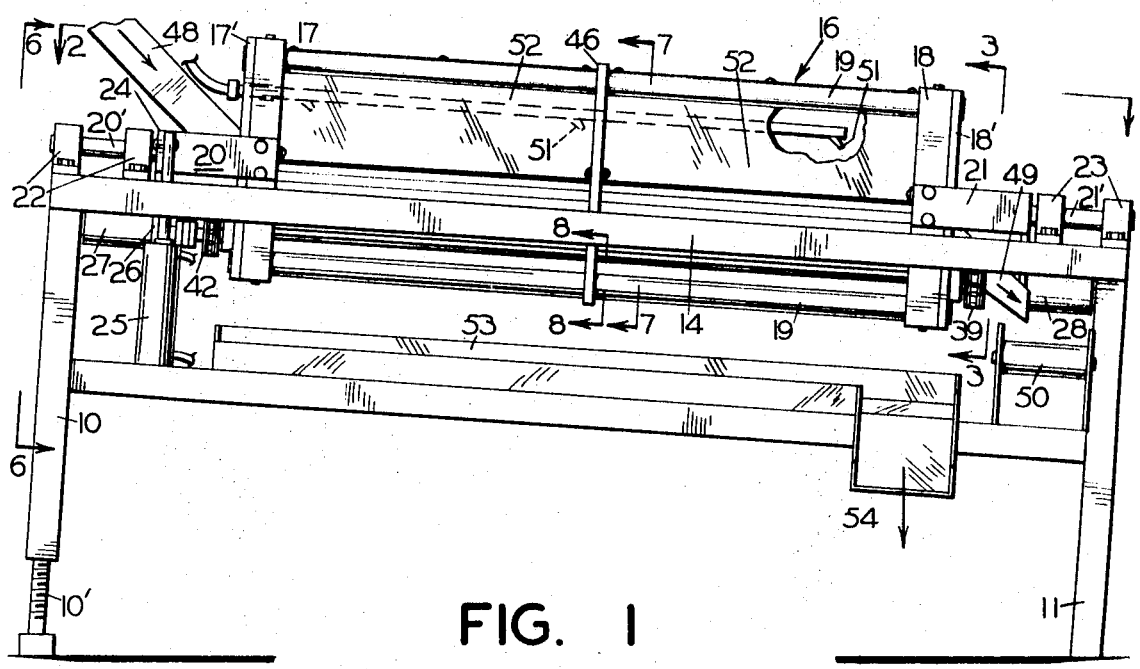
FIG. 1 is a side elevation of the device.
Figure 2:
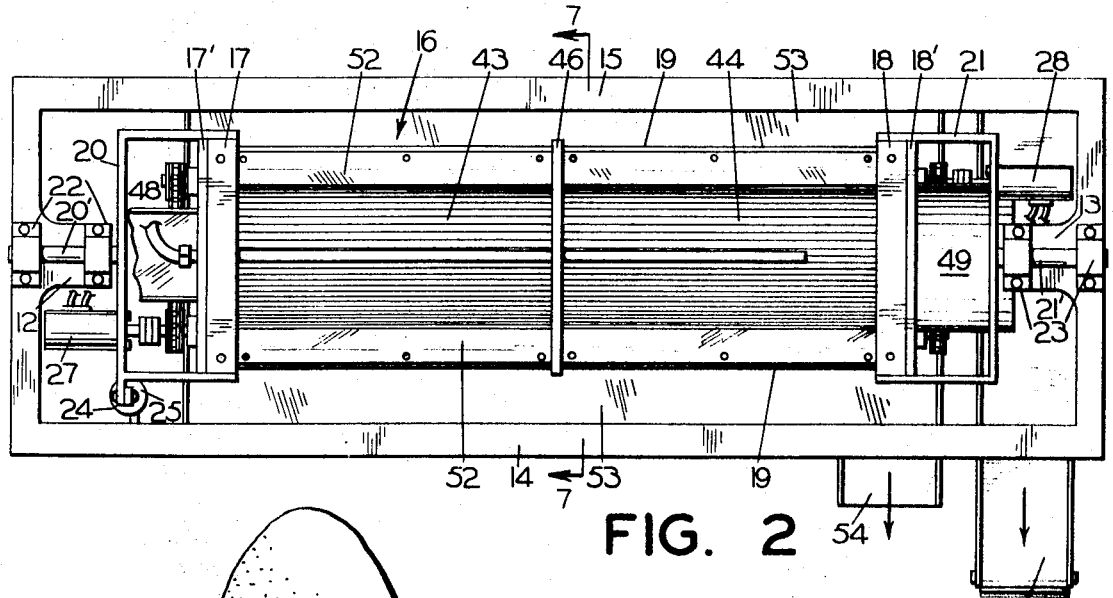
FIG. 2 is a top plan view taken on line 2-2 of FIG. 1.

Referring first to FIGS. 1 and 2, a rigid mounting frame for the device includes pairs of upright legs 10 and 11 at opposite ends of the frame respectively, an open top deck comprising end portions 12 and 13 and side portions 14 and 15, and suitable bracing members (not shown). The legs at one end of the frame have adjustable extensions 10' at their bottom so that the corresponding end of the frame can be raised to cause the mounting frame to slope downwardly to the right (as viewed in FIG. 1) for a reason later apparent.

Figure 4:
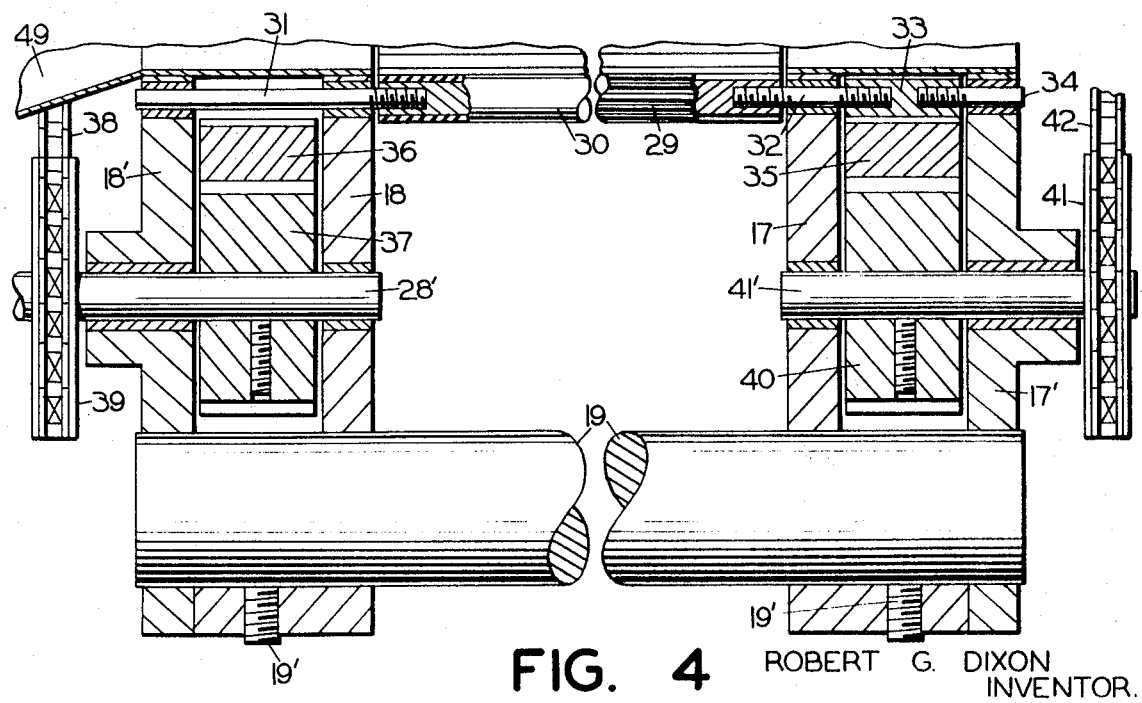
FIG. 4 is a fragmentary foreshortened and further enlarged section taken longitudinally along the roll bed on the line indicated at 4-4 in FIG. 3.

The roll bed assembly, arcuate in cross section and indicated by the reference 16, includes a pair of rectangular end housings 17 and 18, having outer face plates 17' and 18', the housings and their face plates formed with circular openings having approximately the same radius as the roll bed assembly. The assembly also includes a central support plate 46 of the same size as the end housings and their face plates and having a corresponding circular opening of the same size. The end housings and the central support plate are rigidly secured together in spaced parallel relationship by four longitudinally extending tie rods 19, being secured in place on the tie rods in any suitable manner, for example by set screws 19' as shown in FIG. 4. The housings 17 and 18 contain mountings and means for rotating the rollers which form the body of the roll bed assembly, as later explained.

The housings 17 and 18 are supported on a pair of U-shaped brackets 20 and 21 respectively, the sidearms of which are firmly bolted to the sides of the housings. The brackets 20 and 21 carry outwardly extending supporting shafts 20' and 21' respectively, which are centrally positioned on the brackets, and which shafts are in turn supported in pairs of suitable bearing members 22 and 23 respectively, mounted on the end portions 12 and 13 respectively, on the top deck of the frame. The supporting shafts 20' and 21' are in exact alignment with each other. Thus the brackets 20 and 21, and therewith the entire roll bed assembly 16, are mounted for partial rotation or rocking movement on the supporting frame.

Figure 6:
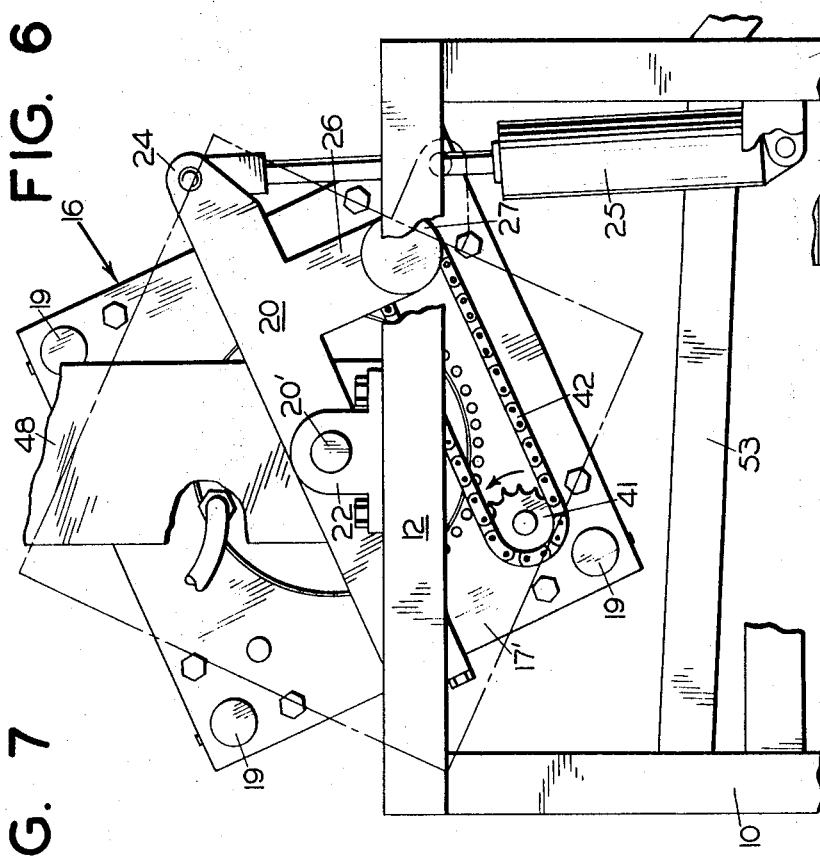
FIG. 6 is a fragmentary end elevation on line 6-6 of FIG. 1, drawn to a larger scale than FIG. 1, but to a smaller scale than FIG. 3, showing the roll bed assembly at one end of its oscillating swing and indicating in broken line the position of the roll bed assembly at the opposite end of its swing.

The bracket 20 has an extension 24 (see also FIG. 6) at one side to which the top end of a piston rod of an automatically reciprocating hydraulic cylinder 25 is pivotally connected, the hydraulic cylinder being pivotally supported on the main frame, as indicated in FIG. 6. The hydraulic cylinder is so arranged and controlled as to cause slow rocking oscillation to be imparted to the entire roll bed assembly 16. The automatically operating cylinder 25 need not be further described since it is a well known piece of equipment and no claim of novelty is made for it. The bracket 20 also has a downwardly extending arm 26 on which a hydraulic motor 27 is mounted. The bracket 21 at the opposite end of the roll bed assembly has a similar arm (not shown) extending downwardly on the opposite side of the supporting bracket 21 on which an identical hydraulic motor 28 is mounted (see also FIGS. 1 and 2). The purpose and function of these opposite pairs of hydraulic motors will be explained later.

Figure 8:
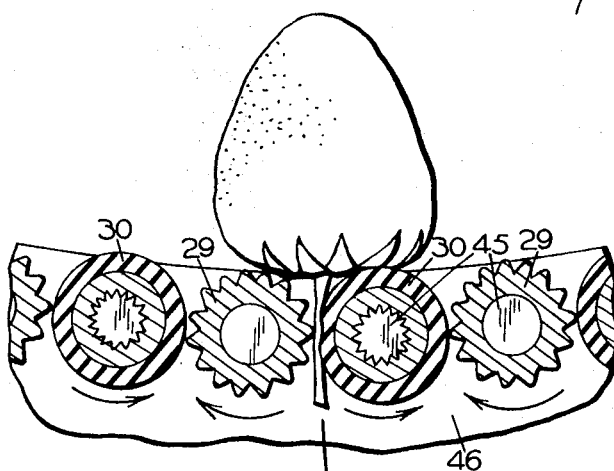
FIG. 8 is a fragmentary section on the line indicated at 8-8 in FIG. 1, drawn to a considerably enlarged scale, showing preferred surfacings on the rollers and illustrating the manner in which the stems and hulls are engaged and pulled from strawberries by the action of the pairs of rollers in the roll bed.
Figure 9:
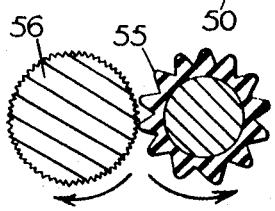
FIG. 9 is a corresponding fragmentary section, drawn to a smaller scale and showing other surfacings which may be used on the rollers.

As previously indicated, the arcuate or troughlike bed of the roll bed assembly is composed of a series of rotating rollers of substantially the same external diameter which are arranged adjacent each other. Preferably the surfacings of these rollers consist of ribbed metal and soft, resilient material such as rubber and the rollers are so arranged that the ribbed metal and the rubber surfacing will be on adjacent rollers, as illustrated in FIG. 8 in which the ribbed metal surfacing and the rubber surfacing are indicated by the references 29 and 30, respectively. However, various other cooperating surfacings may be used on adjacent rollers, depending on the type of fruit or berries being treated. Thus FIG. 9 shows coverings of ribbed rubber and knurled metal indicated by the references 55 and 56 respectively. As indicated by the arrows in FIGS. 8 and 9, the adjacent rollers are rotated in opposite directions. The means of rotating the rollers will be presently described.

Figure 5:
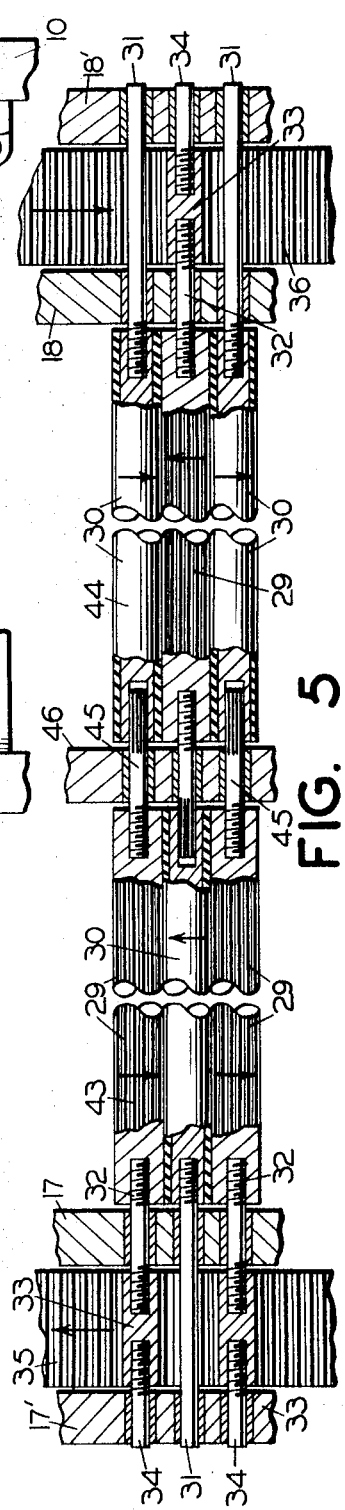
FIG. 5 is a fragmentary foreshortened section taken longitudinally along the roll bed on the line indicated at 5-5 in FIG. 3, drawn to the same scale as FIG. 4, with portions of the rollers broken away to show the manner in which the sections composing each roller are connected, FIGS. 4 and 5 showing preferred surfacings on the rollers.

A pair of spindles 31 and 32 (FIGS. 4 and 5) are secured to the respective ends of each roller and are supported in the housings 17 and 18. The spindle 31 for each roller extends through the housing and outer housing plate, being mounted in bearings in each. The spindle 32 on the opposite end of the roller extends through a bearing in the adjacent housing and is secured to a spindle gear wheel 33 in the interior of the housing, which gear wheel in turn is secured on a second spindle 34 mounted in a bearing in the face plate of the housing. As shown in FIG. 5, the rollers are so arranged and mounted that the spindle gear wheels 33 for alternate rollers will be at one end, and thus in one of the end housings 17 or 18, and the spindle gear wheels for the other intervening rollers will be in the other end housing. A pair of ring gears 35 and 36 are located in the housings 17 and 18 respectively. These ring gears have teeth on both the outer and inner peripheries. Since these two ring gears are identical and are similarly mounted and driven, it will suffice to describe the ring gear 36 in housing 18 which is shown best in FIG. 3.

Figure 3:
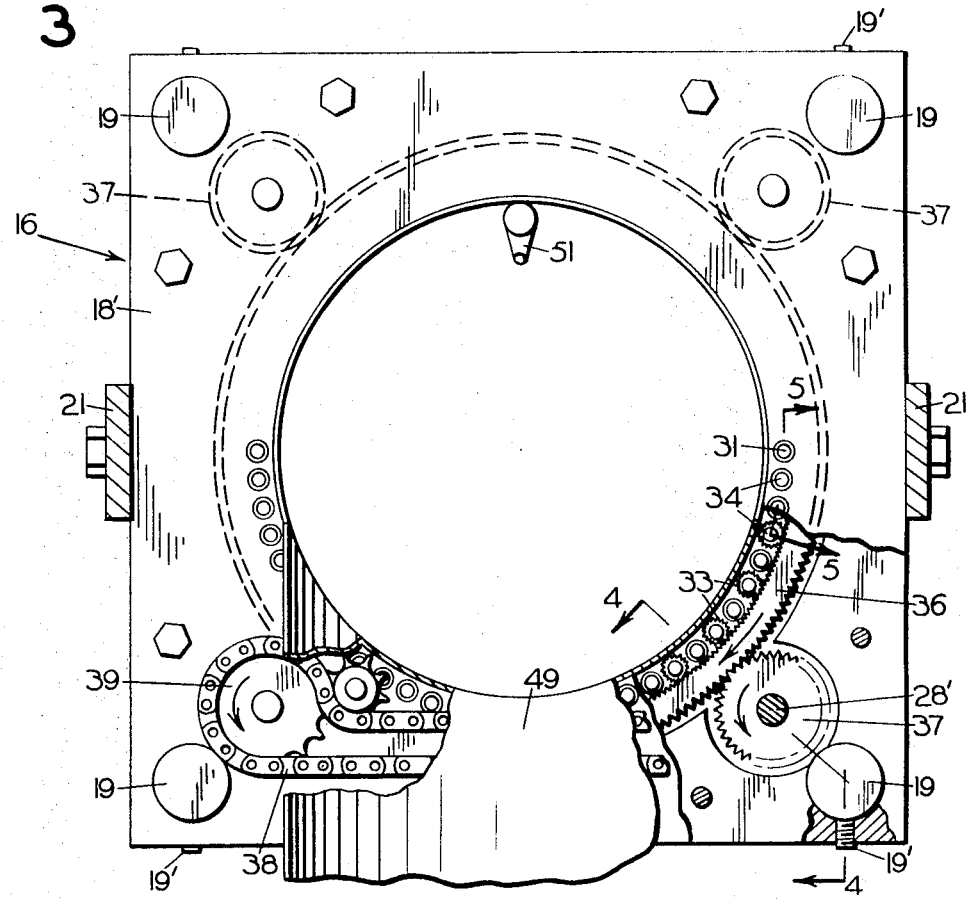
FIG. 3 is a sectional elevation on line 3-3 of FIG. 1, drawn to a larger scale, with portions of the outer face plate of the housing at the adjacent end of the oscillating roll bed assembly broken away to show the means for rotating alternate rollers at that end.

Referring to FIGS. 3 and 4, the ring gear 36 has its outer peripheral teeth meshing with four gear wheels 37, located within four corner portions of the housing 18, with one of these gear wheels 37 being shown in the lower right hand portion of FIG. 3 and two similar upper gear wheels being indicated in broken lines. The lower right hand gear wheel 37 (as shown in FIG. 3) is secured on the shaft 28' driven by the motor 28 (FIGS. 1 and 2). Also secured to the shaft 28' is a sprocket wheel 39 (FIG. 4) which is connected through an endless sprocket chain 38 (FIG. 3) to a sprocket wheel 39 keyed to the shaft on which the second gear wheel 37 (not shown but located in the lower left hand portion of the housing 18, as viewed in FIG. 3) is keyed, which second gear wheel is in mesh with the ring gear 36. Thus, operation of the motor 28 drives the two lower gear wheels 37 in the housing 18 in unison and these gear wheels cause rotation of the ring gear 36. The two upper gear wheels 37 (indicated by broken lines in FIG. 3), also in mesh with the ring gear 36, are idlers serving to maintain the ring gear 36 in place.

The teeth on the inner periphery of the ring gear 36 mesh with the spindle gear wheels 33 which are secured to the spindles 32 upon the corresponding ends of the alternate rollers of the roll bed. In a similar manner the spindle gear wheels on the opposite ends of the other or intervening rollers are driven by the ring gear 35 (FIG. 4) which is located in the housing 17 and mounted and driven in the same manner. Thus the ring gear 35 is in mesh with four gear wheels 40 in housing 17, one of the two bottom ones of which is shown in FIG. 4. The gear wheel 40 shown in FIG. 4 is keyed to a shaft 41' of an exterior sprocket wheel 41 (shown in FIG. 6) which is driven by a sprocket chain 42 from a sprocket wheel secured on the shaft of the other hydraulic motor 27. It will be noted from FIG. 3 that the ring gear 36 in the housing 18 is driven in clockwise direction (as viewed looking toward one end of the roll bed assembly) and from FIG. 6 it will be apparent that the corresponding ring gear in the opposite housing 17, driven from a gear wheel connected with the sprocket 41 (which is rotated in the direction indicated by the arrow) is driven in clockwise direction as viewed looking oppositely and toward the opposite end of the roll bed assembly. In other words, the two ring gears 35 and 36, are rotated in opposite directions and drive opposite ends of alternate rollers, causing the alternate rollers in the roll bed assembly to rotate oppositely, as illustrated in FIG. 8.

The two hydraulic motors 27 and 28, which drive the two ring gears in the housings 17 and 18 respectively, as previously described, are connected by suitable control means (not shown) to a hydraulic pump assembly operated in the well known manner. The hydraulic cylinder 25 (FIG. 6) is also connected through suitable control means to the same pump assembly. Of course, electric motors might be substituted in place of the hydraulic motors in the device, but the use of simple, lightweight hydraulic motors is considered preferable.

Although the rollers which comprise the bed of the roll bed assembly could be formed as integral units, preferably each roller is made up of sections adjustably and removably connected end to end, and the composite rollers supported midway along the roll bed by the central support plate 46 (FIGS. 1, 2, 5 and 7). Three such composite rollers are illustrated in FIG. 5. Thus the body of the top roller in this FIG. is composed of two main sections 43 and 44, their adjacent ends at the middle of the composite roller being connected by a pin 45 firmly secured in the section 43 by threaded engagement with an end channel in section 43 and having splined engagement with the end channel in section 43 and in the adjacent end of of the other section 44. The connecting pin 45 extends through a bearing in the central support plate. Other means for securing the roller sections 43 and 44 to their joining pin 45, such as set screws, for example, could be used, of course, for the means illustrated in FIG. 5.

While the surfacings of the sections of a single roller could all be the same type, thus, for example, both sections 43 and 44 could have a surfacing of resilient rubber, and the sections of the next roller correspondingly all have a surfacing of ribbed metal, it is considered preferable to have the surfacings of the sections of each roller alternate, for example consisting alternately of rubber and ribbed metal, as illustrated in FIG. 5. In this FIG. the first section 43 of the top roller of the group is shown having a surfacing of ribbed metal and the second section 44 of that roller is shown having a surfacing of rubber. If this arrangement of surfacing is followed, then the sections of the next adjacent roller would be oppositely surfaced respectively. Thus, section 48 (FIG. 5) of the next roller would have a surfacing of rubber and section 49 of that roller would have a surfacing of ribbed metal, and so on. In either case, it is important in the carrying out of the invention that the stems of the berries or fruits be drawn down between two oppositely rotating rollers having cooperating surfacings, as illustrated in FIGS. 8 and 9. In some cases the cooperating surfacings might both be similar. Thus in FIG. 9 the surfacings 55 and 56 could both be ribbed rubber and cause the hulls and stems to be pulled down between the rollers. It is not intended to limit the rollers to any particular surfacing so long as the rollers function in the manner desired.

The particular berries or fruit to be stemmed in the device are delivered into the oscillating roll bed assembly 16 through a stationary chute 48 (FIGS. 1 and 2) supported in any suitable manner (not shown) on the stationary main frame. This chute leads down through the circular opening in the face plate and housing at the intake end of the assembly. Treated berries or fruit are discharged from the opposite end of the roll bed down through a chute 49 (see also FIG. 3) secured to the outer face plate 18' of the housing 18, and are delivered onto a suitable endless carrier 50.

Figure 7:
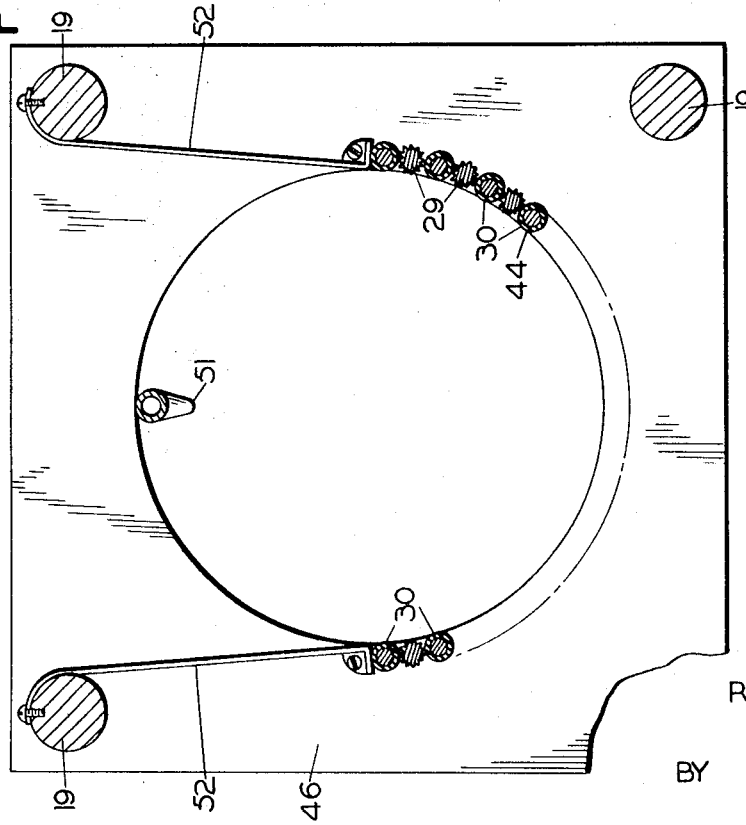
FIG. 7 is a section on line 7-7 of FIG. 1 and FIG. 2, drawn to a larger scale.

Preferably the stationary main frame of the device is tilted, as shown in FIG. 1, so that the oscillating roll bed assembly 16 slopes gently from intake to outlet end. Also preferably, a series of water spray nozzles 51 (FIG. 1) are mounted on the roll bed assembly by suitable means and so arranged as to direct water sprays downwardly and forwardly on the berries or fruit, serving the double purpose of washing the berries or fruit and helping them move along in the oscillating roll bed. To avoid any splashing of the water from the spray nozzles over the top of the sides of the roll bed assembly or the possibility of any berries or fruit escaping over the top of the sides, a pair of shields 52, one of which is shown in FIG. 7, extend longitudinally along above the top roller on opposite sides respectively of the roll bed assembly. These shields are mounted on the upper tie bars 19 on the opposite sides of the assembly respectively.

The stems and hulls which are pulled off of the berries or fruits drop down from the pairs of rollers by which they are seized and are deposited on a pan 53 (FIG. 1) mounted on the main frame of the device and extending along longitudinally beneath the roll bed assembly. The pan 53 has an end discharging chute 54.

The entire roll bed assembly may also preferably be provided with a U-shaped cover (not shown) removably secured to the top and sides of the end housings 17 and 18 and central support plate 46, which may be made in sections and made of either metal or suitable transparent plastic.

I claim:

1. In a device for stemming certain berries and fruits, a roll bed assembly, said bed assembly being arcuate in cross section and composed of a series of rollers mounted adjacent each other, a housing and external housing plate at each end of the assembly for rotatively supporting said rollers, a rotating ring gear in one of said housings for rotating alternate rollers continuously in one direction, a similar rotating ring gear in the other of said housings for rotating the intervening rollers continuously in the opposite direction, said rollers all having approximately the same external diameter, said rollers having a surfacing capable of engaging hulls and stems and of pulling them down between cooperating adjacent rollers, and means for imparting continuous oscillation to said roll bed assembly.